United States Patent [19]

Zunker

[11] Patent Number: 4,801,121

[45] Date of Patent: Jan. 31, 1989

[54] SECURITY BRACKET

[76] Inventor: Donald C. Zunker, 1663 N. Prospect Ave., Milwaukee, Wis. 53202

[21] Appl. No.: 112,738

[22] Filed: Oct. 26, 1987

[51] Int. Cl.[4] .............................................. F16M 13/00

[52] U.S. Cl. .................................. 248/551; 248/218.4

[58] Field of Search ............... 248/551, 552, 553, 200, 248/218.4, 219.4, 220.2, 300, 231.7

[56] References Cited

U.S. PATENT DOCUMENTS

| | | | |
|---|---|---|---|
| 3,278,148 | 10/1966 | Denaro | 248/300 X |
| 3,664,163 | 5/1972 | Foote | 248/551 X |
| 3,669,480 | 6/1972 | Fugate | 248/300 X |
| 4,659,044 | 4/1987 | Armstrong | 248/218.4 |
| 4,709,891 | 12/1987 | Barnett | 248/231.7 X |

*Primary Examiner*—Ramon O. Ramirez
*Attorney, Agent, or Firm*—Andrus, Sceales, Starke & Sawall

[57] ABSTRACT

The securement of bicycles, yard appliances and the like in a shelter structure having wall studs is contemplated. The securement means generally comprise a channel section member that fits over a wall stud. A plate member is secured to the outside of one of the channel member flanges and projects beyond the channel member web. The projecting portion of the plate member is provided with a hole spaced from the edges thereof. After the securement means are mounted relative to a wall stud, a locking member such as a chain or cable passes through the hole and also encircles some portion of the thing to be secured.

5 Claims, 1 Drawing Sheet

SECURITY BRACKET

BACKGROUND OF THE INVENTION

This invention relates to a device utilized for locking a bicycle or a yard appliance and the like when kept in a residential garage or other storage structure.

Bicycles and yard appliances such as snow throwers, garden tillers, lawn mowers, etc. are relatively expensive and customarily kept in residential garages or other storage structures. Generally these items are stored in an unlocked condition. As stored, these items are therefore, not only attractive targets, but also relatively easy marks for thieves. It is generally an object of this invention to provide a form of securement means for bicycles, yard appliances and the like that will make it substantially more difficult for thieves to steal such items from garages or other storage structures.

SUMMARY OF THE INVENTION

Basically the invention contemplates means for the securement of articles such as bicycles, yard appliances or the like in a shelter structure having wall studs or the like. Such means generally comprises a channel section member having opposed flanges and a web that connects the flanges. A plate member is secured to the outside of one of the channel member flanges and projects beyond the channel member web. The means are mountable on a wall stud with the stud being received within the channel section member. The projecting portion of the plate member is provided with a hole spaced from the edges thereof. The hole is adapted to receive and pass a locking member such as a chain or cable that also encircles some portion of the thing to secure the latter relative to the wall stud.

DESCRIPTION OF THE DRAWING FIGURES

The drawings furnished herewith illustrate the best mode presently contemplated for carrying out the invention and are described hereinafter.

DESCRIPTION OF THE ILLUSTRATED EMBODIMENT

Figure 1:
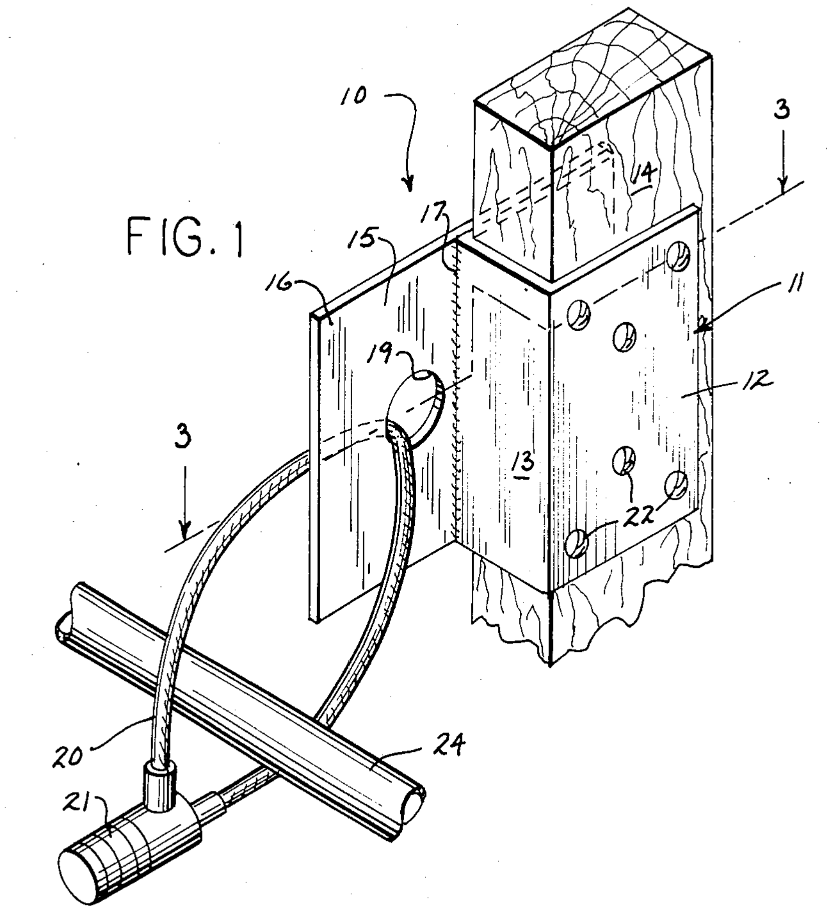
FIG. 1 is a perspective view showing the security bracket of this invention mounted on a building stud.
Figure 2:
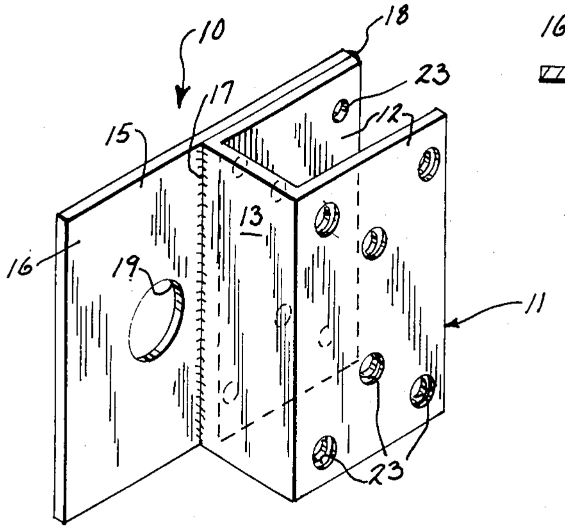
FIG. 2 is a perspective view of the bracket isolated from a stud.

Referring to the drawings, the metal security bracket 10 comprises a U-shaped or channel section member 11 wherein the opposed flanges 12 are connected by a web 13. The security bracket 10 is mountable on a wall stud 14 of a shelter structure such as a garage, shed or other storage structure (not shown) and provides means for securing and/or locking a bicycle or yard appliance or other object relative to the stud.

Figure 3:
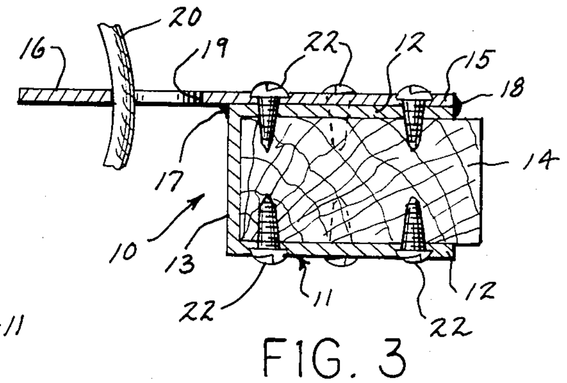
FIG. 3 is a view taken generally along the line 3—3 of FIG. 1.

As perhaps best shown in FIG. 3, the channel section member 11 closely fits onto the stud 14 with the inside dimension of the channel web 13 only slightly exceeding the thickness of the stud and with the depth of the flanges 12 generally approaching the width or depth of the stud. The reasonably close fit of the channel member 11 on the stud 14 serves to discourage tamper mischief through use of a pry bar or similar tool.

The security bracket 10 further includes a generally flat metal plate 15 which overlies one of the channel member flanges 12 and extends outwardly beyond the web 13 to provide the projecting portion 16. As shown in the drawings, the width of the plate 15 may generally correspond to the length of the channel member 11. Preferably, the plate 15 will overlie the flange 12 to its full depth.

Securement between the plate 15 and channel member 11 is attained by at least a pair of generally parallel welds 17 and 18 at the juncture of the plate with the channel web 13 and along the end edge of the plate. When the plate 15 extends to the full depth of the channel flange 12, the weld 18 will be along the common edge formed by the plate and flange as generally shown in the drawings. If desired, the other opposed edges of the plate 15 extending generally normal to the parallel welds 17 and 18 may also be welded to the channel flange 12. The welded connection between the channel member 11 and plate 15 should discourage tamper mischief directed to a separation therebetween.

The projecting portion 16 of the plate member 15 is provided with a hole 19 for the passage of a locking member such as a cable or chain 20 the opposed ends of which can be secured together by a lock or locking mechanism 21. The hole 19 is preferably located generally centrally with respect to the width of the plate 15. In the direction normal to the width of the plate 15, the hole 19 is relatively close to the channel web 13 so as to remain at a substantial distance from the projecting edge of the plate.

During mounting of the security bracket 10, the channel section member 11 is disposed over a wall stud 14 and secured in place by a plurality of wood screws 22. The screws 22 extend into the wall stud 14 through the holes 23 provided in the opposed flanges 12. On the side of the bracket 10 mounting the plate 15, the holes 23, of course, extend or continue through the plate as well. If the screws 22 have rounded heads as shown, the holes 23 are counterbored sufficiently to preclude a possible shearing off of the heads. To further prevent tamper mischief, the screws 22 are of a type that can be threaded into the wood stud 14 to a tight condition, but cannot be turned oppositely.

In service, the locking member such as the cable or chain 20 is made to extend through the hole 19 in the plate 15 of the security bracket 10 and to encircle some portion 24 of a bicycle, appliance or the like before the opposed ends of the cable or chain are brought together and secured by a lock or locking mechanism 21. The portion 24, of course, should be a part not easily removed from the bicycle or appliance. Since many bicycle owners already have appropriate chain or cable or other enveloping locking members with locking means for use when they park their vehicle, the security bracket 10 will allow them to use their existant lock means to minimize expense.

Various modes of carrying out the invention are contemplated as being within the scope of the following claims particularly pointing out and distinctly claiming the subject matter which is regarded as the invention.

1. A security bracket made of rigid material for the securement of an item such as a bicycle or appliance or the like to a shelter structure having wall studs or the like, said bracket comprising a channel section member having opposed flanges and connected by a web, a plate member secured to the outer side of one of the channel member flanges and projecting beyond the channel member web, said bracket being mountable on a wall stud with the stud being received within the channel section member, and threaded members to secure the channel members onto the wall stud, said threaded members being of a type that can be threaded into the wall stud but cannot be turned oppositely to effect a removal, said projecting portion of the plate member having a hole therein spaced from the edges thereof, said hole being adapted to receive and pass a locking chain or cable that also encircles some portion of the item to secure the latter to the wall stud.

2. The structure as set forth in claim 1 wherein the plate member extends to the full length of the channel members.

3. The structure as set forth in claim 2 wherein the plate member extends to the full depth of the channel member flange.

4. The structure as set forth in claim 3 wherein the plate member is secured to the channel member flange by welding.

5. The structure as set forth in claim 4 wherein at least a pair of parallel welds secure the plate member to the channel member flange, with the welds extending longitudinally of the channel member along the common edge between the members and at the juncture of the channel member web with the plate member.

* * * * *